United States Patent [19]

Carcia

[11] Patent Number: 4,587,176
[45] Date of Patent: May 6, 1986

[54] LAYERED COHERENT STRUCTURES FOR MAGNETIC RECORDING

[75] Inventor: Peter F. Carcia, Wilmington, Del.

[73] Assignee: E. I. Du Pont de Nemours and Company, Wilmington, Del.

[21] Appl. No.: 690,886

[22] Filed: Jan. 14, 1985

[51] Int. Cl.$^4$ .............................................. H01F 1/00
[52] U.S. Cl. ..................... 428/611; 428/615; 428/621; 428/635; 428/668; 428/670; 428/694; 428/900; 360/134; 360/135; 360/136; 427/132
[58] Field of Search ............... 428/611, 615, 621, 635, 428/668, 670, 900, 928, 694; 427/132; 360/134, 135, 136

[56] References Cited

U.S. PATENT DOCUMENTS

| | | | |
|---|---|---|---|
| 3,269,854 | 8/1966 | Hei | 428/670 |
| 3,350,180 | 10/1967 | Croll | 428/635 |
| 3,479,156 | 11/1969 | Ginder | 428/928 |
| 3,787,237 | 1/1974 | Grunberg et al. | 427/132 |
| 4,429,016 | 1/1984 | Sugita | 428/692 |
| 4,447,467 | 3/1983 | Oguchi et al. | 427/48 |
| 4,452,864 | 6/1984 | Kitahara et al. | 428/611 |
| 4,472,248 | 9/1984 | Koskenmaki | 204/43 P |

OTHER PUBLICATIONS

Iwazaki, *IEEE Trans. Magn.* MAG-20:657 (1984).
Naoe et al., *IEEE Trans. Magn.* MAG-17:3184 (1981).
Iwasaki et al., *IEEE Trans. Magn.* MAG-14:849 (1978).
Kobayashi et al., *J. Appl. Phys.* 52:2453 (1981).

*Primary Examiner*—John P. Sheehan

[57] ABSTRACT

Layered coherent structures characterized by periodic, alternating layers of cobalt and palladium and/or platinum exhibit perpendicular magnetic anistropy.

15 Claims, 2 Drawing Figures

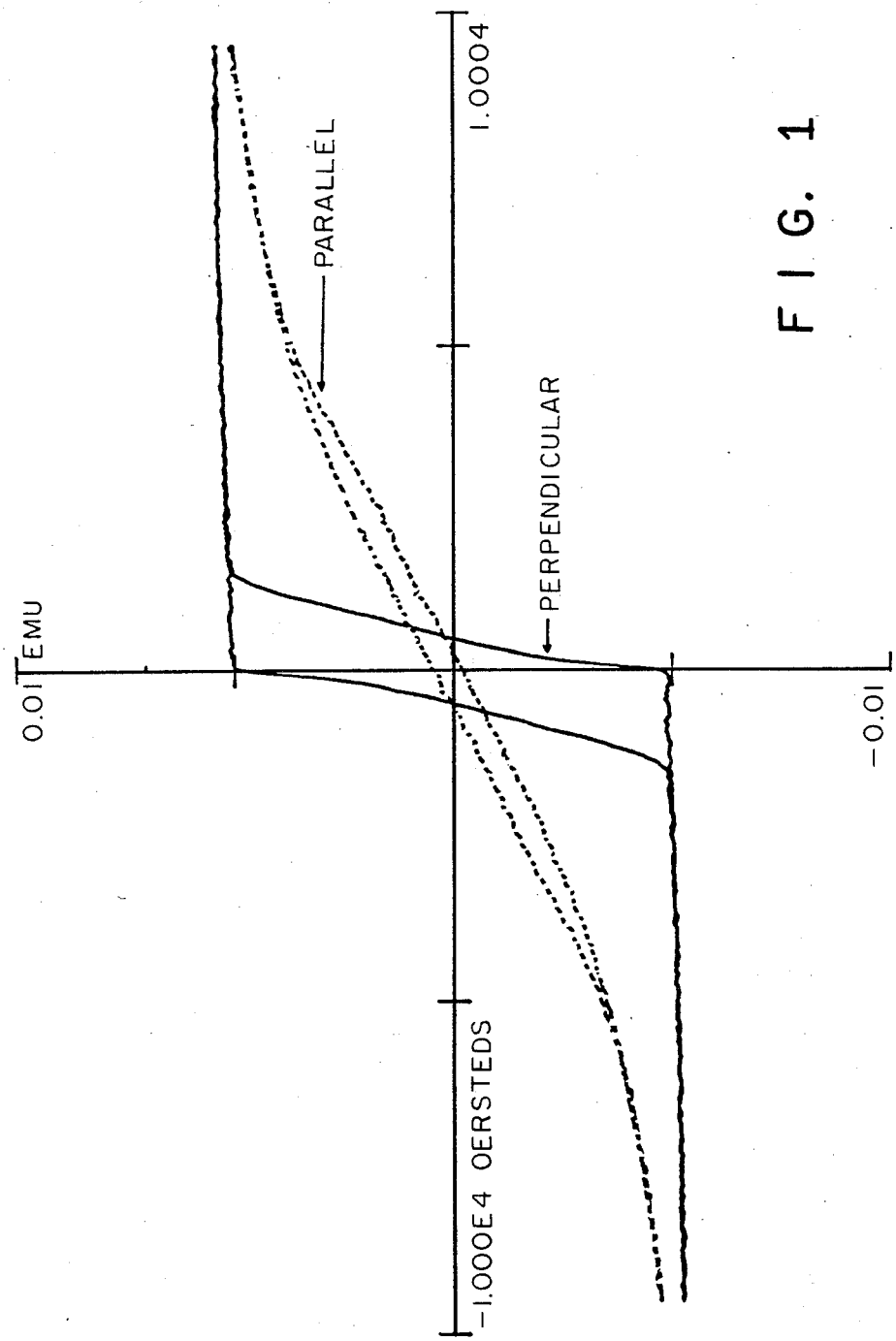
F I G. 1

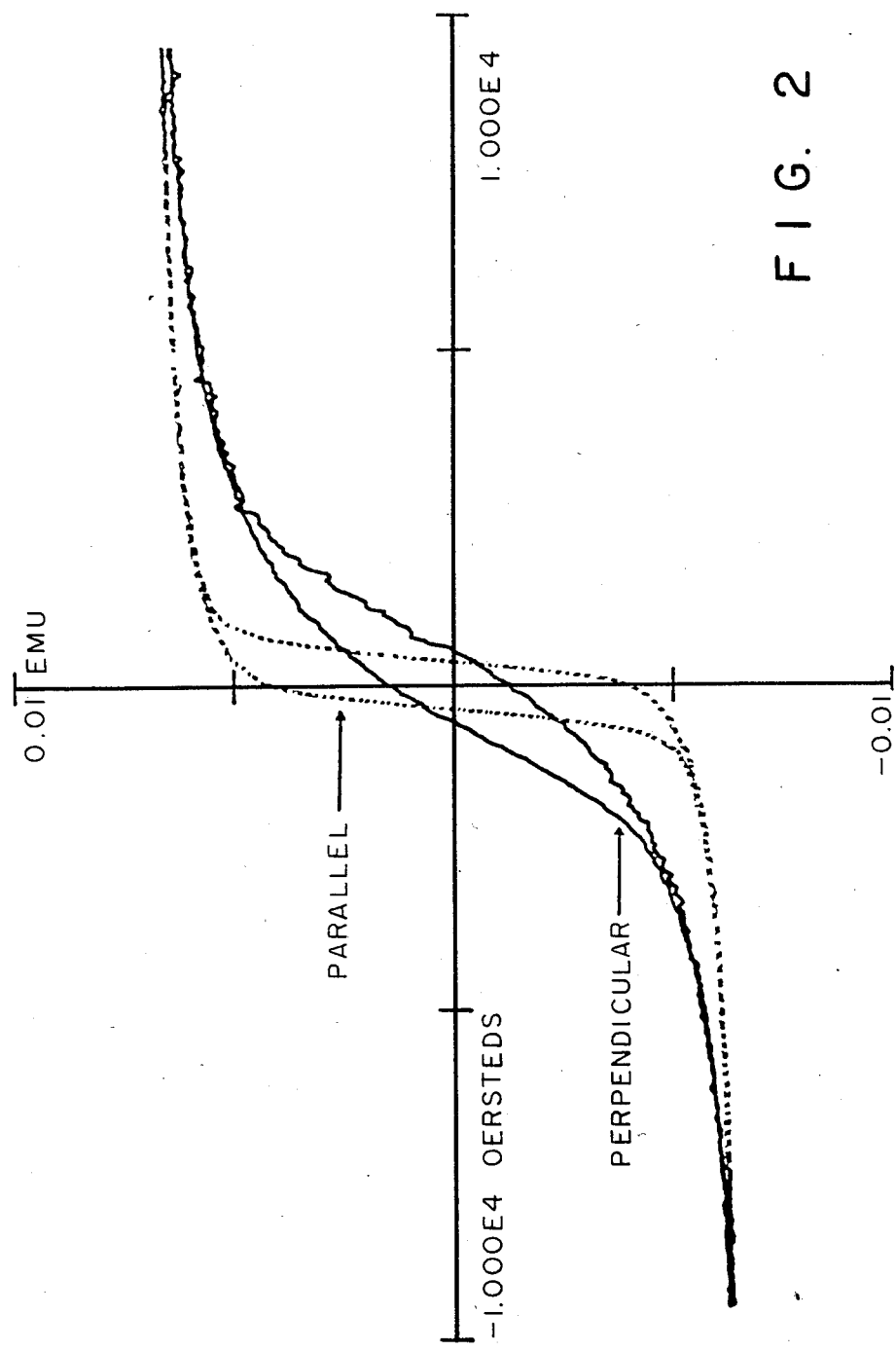

LAYERED COHERENT STRUCTURES FOR MAGNETIC RECORDING

BACKGROUND OF THE INVENTION

The present invention relates generally to magnetic materials, and particularly to layered bimetallic structures exhibiting perpendicular magnetic anisotropy.

A major objective of research efforts seeking to improve magnetic recording media has been to increase the absolute density of recorded information. Practically all magnetic recording media now in use employ a magnetizable layer or layers comprising magnetizable particles dispersed in an organic binder. During recording, these media are exposed to fields which magnetize the recording layer in a longitudinal, or in-plane direction, hereinafter referred to as the "parallel" direction. As recording density is increased in the parallel direction, however, the demagnetizing field of the recording layer increases, which results in reduction and rotation of remanent magnetization and a corresponding reduction in the output or playback signal. For these reasons, achievable information density in parallel recording systems is now reaching theoretical limitations.

A new approach to ultrahigh recording densities is known as perpendicular magnetic recording. In perpendicular magnetic recording modes, magnetization is applied to a recording medium along an axis normal, or perpendicular to, the plane of the recording layers. In this mode, as the wavelength of recording signals is decreased and recording density is increased, the demagnetizing field is decreased. Moreover, where adjacent bits are oppositely magnetized, they tend to reinforce, rather than demagnetize each other, further contributing to higher recording densities. Iwasaki, *IEEE Trans. Magn.* MAG-20:657 (1984) provides a discussion of the state of the art relating to perpendicular magnetic recording media.

Perpendicular magnetic recording modes require a recording medium having an "easy" axis of magnetization which is normal, or perpendicular, to the plane of the recording layer. The majority of magnetic recording media tend to favor an "easy" axis of magnetization which is parallel to the plane of the recording layer. However, a few candidate materials have been investigated which exhibit perpendicular magnetic anisotropy as a result of their crystallographic characteristics.

For example, certain ferrites, notably barium ferrite, exhibit a hexagonal crystal structure which can be exploited to achieve perpendicular magnetic anisotropy. These materials can be applied to substrates by sputtering, as disclosed by Naoe et al., *IEEE Trans. Magn.* MAG-17:3184 (1981), or exposed to a strong magnetic field to align the c-axis of the ferrite crystallites normal to the plane of the layer in which they are applied. Exemplary of the latter approach is the method for preparing perpendicular recording media disclosed by Oguchi et al., U.S. Pat. No. 4,447,467. According to this method, hexagonal crystallites of barium ferrite, strontium ferrite, lead ferrite, or calcium ferrite are dispersed in a fluid coating layer on an inert substrate. Following exposure of the resulting composite to a magnetic field to orient the crystallites in the perpendicular direction, the viscosity of the coating layer is increased to preclude further movement of the crystallites.

Cobalt also exhibits a hexagonal crystalline structure, and various alloys and other mixtures containing cobalt have been proposed for perpendicular magnetic recording.

For example, Kostenmaki, U.S. Pat. No. 4,472,248, discloses a method for preparing thin-film perpendicular magnetic recording media by electro-depositing a coating onto an electrically conductive substrate from an aqueous coating bath including cobalt, hypophospite, and optionally nickel ions.

Kitahara, et al., U.S. Pat. No. 4,452,864, describe perpendicular magnetic recording media having a magnetic layer composed of from 75 to 90 percent by weight cobalt, up to 15 percent molybdenum, and the balance vanadium and unavoidable impurities. These media are prepared by sputtering.

The most widely reported and apparently successful perpendicular magnetic recording media are sputtered films of cobalt-chromium alloys, which exhibit crystallographic perpendicular magnetic anisotropy. The role of chromium in such alloys is to reduce overall magnetization, and hence, in-plane demagnetizing forces. For example, Sugita, U.S. Pat. No. 4,429,016, discloses magnetic recording media produced by sputtering thin layers of a cobalt-chromium alloy onto a substrate. Additional details regarding cobalt-chromium perpendicular recording media can be found in Iwasaki, et al., *IEEE Trans. Magn.* MAG-14:849 (1978), and Kobayashi et al., *J. Appl. Phys.* 52:2453 (1981).

It has now been found that layered coherent structures of palladium and/or platinum and cobalt, characterized by a periodic structure comprising oligatomic layers of cobalt separated by regions of palladium and/or platinum, exhibit characteristics which are useful for magnetic recording, particularly perpendicular magnetic recording.

SUMMARY OF THE INVENTION

The present invention provides layered coherent structures characterized by periodic, alternating layers of cobalt and palladium and/or platinum, wherein each cobalt layer is less than about 8 Å thick, and each palladium and/or platinum layer is greater than about 0.65 $\lambda$ in thickness, where $\lambda$ represents the total thickness of a single period.

BRIEF DESCRIPTION OF THE DRAWINGS

FIG. 1 is a hysteresis diagram obtained by magnetizing a sample structure of the invention, described herein as Example 1, using a vibrating sample magnetometer. The magnetic field applied was swept between 9500 Oe and −9500 Oe in planes both parallel to and perpendicular to the thin film sample. The hysteresis loop indicated by solid tracings corresponds to that observed for magnetization in the perpendicular plane; that indicated by dotted tracings corresponds to magnetization in the parallel plane.

FIG. 2 is a hysteresis diagram obtained by magnetizing a comparative structure described herein as Comparison B. The conditions employed were substantially similar to those described for FIG. 1, above.

DETAILED DESCRIPTION OF THE INVENTION

The materials provided by the present invention are layered coherent structures (LCS) or metal superlattices of cobalt and palladium and/or platinum. These compositions consist of alternating thin layers having a periodicity $\lambda$ equal to the thickness of two adjacent layers of cobalt and palladium and/or platinum. Where each cobalt layer is less than about 8 Å in thickness. and each palladium and/or platinum layer is greater than about 0.65 $\lambda$ in thickness, the resulting structures are useful magnetic recording media, particularly for perpendicular magnetic recording. Generally, structures prepared in accordance with the present invention exhibit an "easy" axis of magnetization normal to their surfaces, or perpendicular magnetic anisotropy.

Although the periodicity $\lambda$ is not a critical parameter in defining the structures of the invention, values for $\lambda$ which are less than about 100 Å are preferred. Values for $\lambda$ which are very much larger than 100 Å provide structures with remanent magnetizations which are impracticably small for recording applications.

Similarly, the total thickness of a given LCS, herein identified as T, is not critical to the operability of the present invention. Preferably, T ranges from about 3000 Å to about 20,000 Å. Structures which comprise too few layers generally will exhibit too small a magnetization for magnetic recording applications, while structures having an excessive number of layers, and hence, thickness, will not be economical or convenient to manufacture.

Preferably, the thickness of the cobalt layers in the layered coherent structures of the present invention is less than about 7 Å. Preferably, the nonmagnetic layers are palladium, and are greater than about 0.80 $\lambda$ in thickness. Most preferably, the thickness of the cobalt layers is less than about 5 Å, and the thickness of the palladium layers is greater than about 0.90 $\lambda$. The preferred ranges set forth herein identify structures having the most suitable characteristics for perpendicular magnetic recording applications.

The structures of the present invention can be deposited as thin films upon a variety of substrates, for example, glass, paper, aluminum, or such polymeric materials as polyimide, polystyrene, polyethylene, poly(ethylene terephthalate), and others. The structures of the present invention can be prepared by a variety of deposition techniques, including RF sputtering, vapor deposition, molecular beam epitaxy, and others. These techniques are relatively well known methods for preparing thin metallic films and will not be detailed herein.

It should be emphasized that the structures of the present invention are not alloys of cobalt and palladium and/or platinum, but rather, metal superlattices exhibiting a clearly defined periodic structure. Alloys of palladium and cobalt do not exhibit perpendicular magnetic anisotropy. This phenomenon requires layering and the presence of cobalt/palladium or cobalt/platinum interfaces. Although the present invention is not to be limited to a particular theory or mechanism, it is presently thought that layered coherent structures within the scope of the present invention provide surface forces at palladium/cobalt or platinum/cobalt interfaces which cause cobalt atoms to be easier to magnetize with the magnetic field applied normal to the film plane. Generally, dominant perpendicular magnetic anisotropy is observed where cobalt layers contain fewer than four atomic layers.

The present invention can be further understood by reference to the following examples. The following examples are to be considered as illustrative only of the present invention, which is limited only by the scope of the appended claims.

EXAMPLES 1–10 and COMPARISONS A–D

In this series of experiments, palladium/cobalt layered coherent structures were prepared by RF sputtering and tested for perpendicular magnetic anisotropy. Samples representative of the invention have been designated Examples 1 through 10, and samples with structural characteristics outside the scope of the present claims have been designated Comparisons A through D.

Sample Preparation

Each sample to be tested was prepared by RF sputtering from cobalt and palladium targets onto glass or polyimide substrates. A 6.5 in (16.5 cm) diameter cobalt magnetron sputtering target held at about 200 volts, and a 6 in (15.2 cm) diameter palladium target held at about 1000 volts (Example 10; Comparison D) or about 1700 volts (all other experiments), were employed at a target to substrate distance of 2.75 in (7 cm). Background pressure prior to sputtering was held at $2\times10^{-7}$ Torr ($2.7\times10^{-5}$ Pa), which was provided by a conventional diffusion-pumped vacuum station equipped with a liquid nitrogen cold trap. Sputtering gas was high purity argon held at $1\times10^{-2}$ Torr (1.33 Pa) during deposition. The resulting deposition rates varied between 1 and 10 Å per second.

Each sample was exposed to the sputtering targets using a rotating table, which was arranged so that the target was exposed to the cobalt and palladium sputtered fluxes in alternate, repeating fashion. In addition, the motion of the table was programmed in advance to permit the table to pause for preselected periods during either cobalt or palladium deposition. In this manner, the relative thicknesses of palladium and cobalt layers could be controlled. The cobalt and palladium targets were physically separated to eliminate the possibility of overlap of their sputtered fluxes.

Sample Testing

X-ray diffraction patterns obtained for the resulting thin films indicated satellite peaks characteristic of a periodic layered structure of alternating palladium and cobalt regions. Analysis of the spacing between X-ray satellite peaks provided a measure of periodicity $\lambda$, which varied between 10 and 100 Å. Total film thicknesses varied between 3,000 and 20,000 Å, and were determined by multiplying periodicity $\lambda$ and the measured total number of rotations N. Relative weight concentrations of palladium and cobalt were determined by X-ray microprobe analyses using electron excitation. The corresponding thicknesses of palladium and cobalt in single periods were then calculated using the respective densities of each metal (Pd=12.02 g/cm$^3$; Co=8.9 g/cm$^3$).

The structural characteristics of Examples 1–20 and Comparisons A–D are set forth below in Table I. Columns a through f of Table I contain the following physical parameters:

a. Relative deposition times, (t(Pd)/t(Co))

The numbers in this column indicate the length of the period, in seconds, during which a particular sample was held stationary under either the palladium or cobalt sputtering targets. Zero indicates that the sample was moved under a target without pausing.

b. Periodicity, (λ)

This parameter, provided in angstroms (Å), corresponds to the approximate thickness of a single palladium/cobalt period, or bilayer.

c. Film Thickness, (T)

This value, in microns (μm), corresponds to the measured total thickness of the entire layered coherent structure.

d. Single Period Cobalt Thickness, (d(Co))

This value, in Å, corresponds to the approximate thickness of the cobalt region in each period.

e. Single Period Palladium Thickness, (d(Pd))

This value, in Å, corresponds to the approximate thickness of the palladium region in each period.

f. Number of Layers, (N)

This value represents the number of total periods in a particular layered coherent structure, determined by counting rotations during sputtering.

The magnetic characteristics of the samples of Examples 1–10 and Comparisons A–D were measured using a vibrating sample magnetometer in applied fields up to 9.5 KG, both parallel and perpendicular (normal) to the film plane. Magnetic moments were recorded by reference to a pure nickel calibration standard. Each magnetic moment was normalized to sample volume. The results obtained are set forth in Table II, below. Columns g through k of Table II provide the following information:

g. Magnetization, ($M_o$)

This value represents the magnetization measured at 9500 Oersteds (Oe), normalized to sample volume and corrected for background substitution. The units reported are emu/$cm^3$.

h. Magnetic Susceptibility (Normal),(dM/dH(N))

The magnetic susceptibility in the normal, or perpendicular, direction, was determined by measuring the slopes of straight lines approximating the average slope of the hysteresis loops obtained in the perpendicular direction. Units reported are emu/$cm^3$—KOe.

i. Magnetic Susceptibility (Parallel), (dM/dH(P))

Magnetic susceptibilities in the parallel direction were determined as described for the normal direction.

j. Coercitivity, ($H_c$)

These values represent the magnitude, in Oersteds, of the magnetic field required to reduce the magnetization to zero.

k. Relative Remanent Magnetization, (Mr(N)/Mr(P))

This ratio of the remanent magnetization in the normal direction versus the remanent magnetization in the parallel direction provides an index of the utility of a sample for perpendicular magnetic recording. Generally, values greater than about 1 indicate magnetic properties suitable for perpendicular magnetic recording.

FIG. 1 is a hysteresis diagram obtained for the sample of Example 1. Hysteresis loops obtained by sweeping the magnetometer field from 9500 Oe to −9500 Oe in both parallel and perpendicular planes are indicated. The slope of the hysteresis loops obtained during sweeping in the perpendicular plane exceeds that observed during sweeping in the parallel plane, indicating useful perpendicular magnetic anisotropy.

FIG. 2 is a hysteresis diagram obtained for the sample of comparison B. Unlike FIG. 1, the slope of the hysteresis loops obtained during sweeping in the perpendicular plane is not greater than that for loops obtained during sweeping in the parallel plane.

COMPARISON E

For further comparison, a 1.2 μm sputtered cobalt thin film was prepared by sputtering directly from a cobalt target onto a polyimide substrate. An applied field of less than 100 Oe was sufficient to fully magnetize the film in the parallel plane, while an applied field of 9500 Oe in the perpendicular direction was unable to achieve full magnetization. The magnetic susceptibility in the parallel plane approached infinity, while the magnetic susceptibility for magnetization in the perpendicular direction was about 96.5 emu/($cm^3$—KOe). These results suggest that the in-plane direction is typically the easy axis of magnetization for thin films of cobalt atoms.

TABLE I

Structural Characteristics of Palladium/Cobalt Layered Coherent Structures (Examples 1–10; Comparisons A–D)

| Example/Comparison | a t(Pd)/t(Co) (sec/sec) | b λ (Å) | c T (μm) | d d(Co) (Å) | e d(Pd) (Å) | f N |
|---|---|---|---|---|---|---|
| 1 | 12/0 | 91.8 | 1.84 | 4.9 | 86.9 | 200 |
| 2 | 12/2 | 85.6 | 1.71 | 7.2 | 78.4 | 200 |
| 3 | 6/0 | 55.1 | 1.65 | 4.7 | 50.4 | 300 |
| 4 | 6/2 | 62.7 | 1.25 | 7.8 | 54.9 | 200 |
| 5 | 3/0 | 40.8 | 2.04 | 4.9 | 35.9 | 500 |
| 6 | 3/1 | 39.1 | 0.78 | 6.0 | 33.1 | 200 |
| 7 | 3/2 | 41.0 | 0.82 | 7.4 | 33.6 | 200 |
| 8 | 1/0 | 31.3 | 0.78 | 4.9 | 26.4 | 250 |
| 9 | 0/1 | 24.6 | 0.62 | 5.6 | 19.0 | 250 |
| 10 | 1/0 | 15.3 | 0.31 | 4.7 | 10.6 | 200 |
| A | 12/4 | 85.4 | 1.71 | 9.7 | 75.7 | 200 |
| B | 12/6 | 92.0 | 0.92 | 13.0 | 79.0 | 100 |
| C | 6/3 | 58.0 | 1.16 | 9.3 | 48.7 | 200 |
| D | 0/1 | 15.0 | 0.30 | 6.6 | 8.4 | 200 |

TABLE II

Magnetic Characteristics of Palladium/Cobalt Layered Coherent Structures (Examples 1–10; Comparisons A–D)

| Example/Comparison | g $M_o$ (emu/$cm^3$) | h dM/dH(N) emu/($cm^3$-KOe) | i dM/dH(P) emu/($cm^3$-Koe) | j $H_c$ (Oe) | k Mr(N)/Mr(P) |
|---|---|---|---|---|---|
| 1 | 81.4 | 87.8 | 15.1 | 550 | 14 |
| 2 | 121.6 | 92.5 | 58.4 | 350 | 2.5 |
| 3 | 118.0 | 95.8 | 18.5 | 400 | 10 |
| 4 | 176.1 | 88.6 | 77.5 | 400 | 1.1 |
| 5 | 181.1 | 91.2 | 28.6 | 500 | 5 |
| 6 | 223.4 | 99.5 | 46.2 | 350 | 4 |
| 7 | 273.4 | 84.7 | 118.6 | 400 | 0.7 |
| 8 | 257.4 | 99.4 | 46.2 | 400 | 4 |
| 9 | 378.5 | 108.4 | 76.8 | 400 | 1.1 |
| 10 | 477.5 | 108.9 | 81.7 | 550 | 1.5 |
| A | 139.4 | 72.8 | 244.0 | 400 | 0.6 |
| B | 194.0 | 66.4 | 302.0 | 500 | 0.25 |
| C | 216.5 | 88.6 | 165.2 | 450 | 0.5 |
| D | 650.9 | 111.1 | 240.7 | 350 | 0.35 |

What is claimed is:

1. A layered coherent structure characterized by periodic, alternating layers of cobalt and palladium and/or platinum, wherein each cobalt layer is less than about 8 Å thick, and each palladium and/or platinum layer is greater than about 0.65 λ in thickness, where λ represents the total thickness of a single period.

2. A structure according to claim 1, characterized by periodic, alternating layers of cobalt and palladium.

3. A structure according to claim 2, wherein each cobalt layer is less than about 7 Å thick.

4. A structure according to claim 3, wherein each palladium layer is greater than about 0.80 λ in thickness.

5. A structure according to claim 4, wherein λ is less than about 100 Å.

6. A structure according to claim 5, wherein each cobalt layer is less than about 5 Å thick.

7. A structure according to claim 6, wherein each palladium layer is greater than about 0.90 λ in thickness.

8. A recording member comprising a substrate and a recording layer consisting essentially of a layered coherent structure of claim 1.

9. A recording member comprising a substrate and a recording layer consisting essentially of a layered coherent structure of claim 2.

10. A recording member according to claim 9, wherein the recording layer is between 3,000 and 20,000 Å in total thickness.

11. A recording member comprising a substrate and a recording layer, wherein the recording layer is between 3,000 and 20,000 Å in total thickness and consists essentially of a layered coherent structure of claim 3.

12. A recording member comprising a substrate and a recording layer, wherein the recording layer is between 3,000 and 20,000 Å in total thickness and consists essentially of a layer coherent structure of claim 4.

13. A recording member comprising a substrate and a recording layer, wherein the recording layer is between 3,000 and 20,000 Å in total thickness and consists essentially of a layer coherent structure of claim 5.

14. A recording member comprising a substrate and a recording layer, wherein the recording layer is between 3,000 and 20,000 Å in total thickness and consists essentially of a layer coherent structure of claim 6.

15. A recording member comprising a substrate and a recording layer, wherein the recording layer is between 3,000 and 20,000 Å in total thickness and consists essentially of a layer coherent structure of claim 7.

* * * * *